United States Patent
Huhn

[11] Patent Number: 5,785,405
[45] Date of Patent: Jul. 28, 1998

[54] DEVICE FOR ADJUSTING A PRESETTABLE LIGHTING LEVEL OF A HEADLIGHT IN MOTOR VEHICLES

[75] Inventor: Wolfgang Huhn, Schwabhausen, Germany

[73] Assignee: Bayerische Motoren Werke, Munich, Germany

[21] Appl. No.: 682,374

[22] Filed: Jul. 17, 1996

[30] Foreign Application Priority Data

Jul. 17, 1995 [DE] Germany ................ 195 25 981.5

[51] Int. Cl.⁶ ............................................. B60Q 2/06
[52] U.S. Cl. ...................... 362/66; 362/61; 362/285; 362/286
[58] Field of Search ................ 362/61, 66, 287, 362/284, 285, 286

[56] References Cited

U.S. PATENT DOCUMENTS

| | | | |
|---|---|---|---|
| 4,620,267 | 10/1986 | Cibie | 362/66 |
| 4,768,135 | 8/1988 | Kretschmer et al. | 362/66 |
| 4,858,080 | 8/1989 | Oikawa | 362/66 |
| 4,891,559 | 1/1990 | Matsumoto et al. | 362/66 |
| 5,193,894 | 3/1993 | Lietar et al. | 362/66 |
| 5,588,733 | 12/1996 | Gotou | 362/66 |

FOREIGN PATENT DOCUMENTS

| | | |
|---|---|---|
| 36 01 388 | 7/1987 | Germany . |
| 43 08 514 | 9/1993 | Germany . |

*Primary Examiner*—Thomas M. Sember
*Attorney, Agent, or Firm*—Evenson, McKeown, Edwards & Lenahan, PLLC

[57] ABSTRACT

In a device for adjusting a presettable lighting level of a headlight in motor vehicles, the headlight is provided with a control device for adjusting a tilt angle of the headlight, and a control device assigns a corresponding tilt angle to each presettable lighting level.

2 Claims, 1 Drawing Sheet

DEVICE FOR ADJUSTING A PRESETTABLE LIGHTING LEVEL OF A HEADLIGHT IN MOTOR VEHICLES

BACKGROUND AND SUMMARY OF THE INVENTION

The invention relates to a device for adjusting a presettable lighting level of a headlight in motor vehicles.

A device of this kind is known, for example, from German Patent document DE 43 08 514 A1. Adjustment of different lighting levels of a headlight is required for example in countries whose laws prescribe certain lighting levels for certain environmental conditions. In particular, it is required by law in certain countries to turn on a daytime running light with a reduced lighting level. To reduce the lighting level to a preset value, it is known for example from the German Patent document DE 43 08 514 A1 to pulse the headlight bulbs on and off at a preset duty factor (pulse-width modulation) while the headlight is operating. A dimming method of this kind, however, shortens the lifetime of the bulbs by frequently switching them on and off. It is also known to reduce the lighting level of headlights by using a lower supply voltage to the bulbs. Such a dimming method poses problems, however, since the majority of headlight bulbs react sensitively to low voltage.

The goal of the invention is to permit adjustment of differently presettable lighting levels of a headlight without negatively influencing the headlight bulbs with regard to their optimum range and lifetime.

This goal is achieved by device for adjusting a presettable lighting level of a headlight in motor vehicles, characterized in that the headlight is provided with a control device for adjusting a tilt angle of the headlight, the control device assigning to each presettable lighting level a corresponding tilt angle.

According to the invention the headlight is provided with a control device for adjusting a tilt angle of the headlight. The control device assigns a corresponding tilt angle to each presettable lighting level.

The invention improves upon already known control devices for adjusting a tilt angle of the headlight to achieve a required range of a headlight. In known control devices for adjusting a tilt angle, correction of the required range is performed especially when loading or accelerating the vehicle, i.e. when the tilt of the body changes. Manually controllable and automatically adjustable systems are known for this purpose. A feature common to all control devices for adjusting a tilt angle of the headlight is an electrically controllable positioning element. This positioning element, which is present in any event, is either additionally or exclusively utilized according to the invention to adjust a tilt angle corresponding to a presettable lighting level. A preset lighting level usually relates to a defined measurement point in front of the headlights installed in the motor vehicle. When the headlights are switched on, an illuminated area appears on the road in front of the motor vehicle. The brightness of the area decreases inversely with distance from the motor vehicle headlights. The pattern of brightness relative to the illuminated area also depends on the tilt angle of the headlights, however. For example, if a defined reduced lighting level is prescribed for a certain driving situation, the tilt angle of the headlights is increased in such fashion according to the invention that the preset lighting level is reached, especially at the defined measurement point. This can be performed for example as a control when a table is stored in the control device that assigns appropriate tilt angles which correspond to presettable lighting levels. The tilt angle thus determined can have an additional tilt angle superimposed on it, however, which provides for a load-dependent correction of the required lighting level for example.

With this invention, a presettable lighting level of a headlight can be adjusted without simultaneously adversely influencing the headlight bulbs with respect to their lifetime and brightness. It should also be mentioned that the term "lighting level" refers not to the headlight bulb but to an area illuminated by the headlight, for example, at an ECE standard measurement panel placed 25 m away from and perpendicular to the headlight surface.

Other objects, advantages and novel features of the present invention will become apparent from the following detailed description of the invention when considered in conjunction with the accompanying drawings.

DETAILED DESCRIPTION OF THE DRAWINGS

Figure 1:
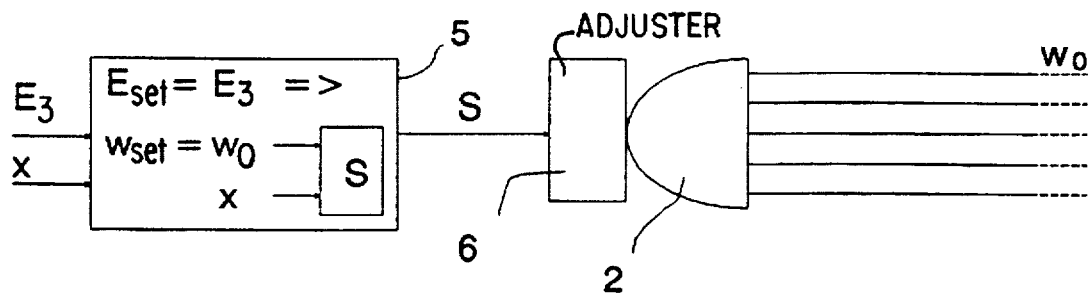
FIG. 1 shows the usual adjustment of the tilt angle of a low-beam headlight, especially during night driving.
Figure 1:
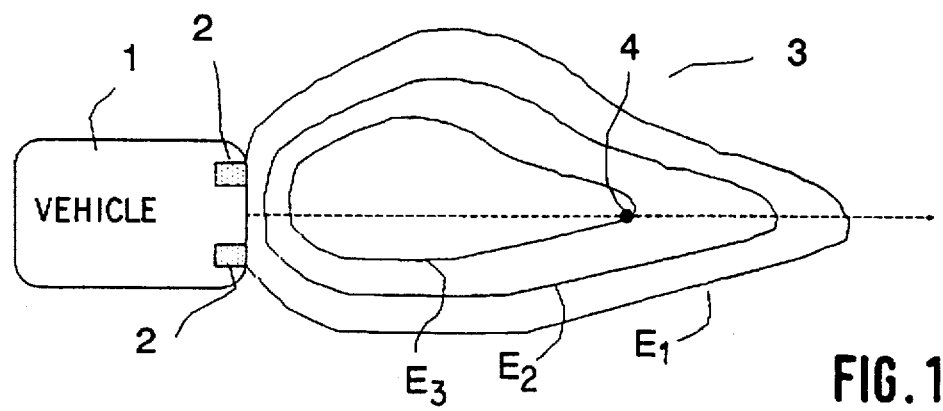

In the lower part of FIG. 1, a top view of a motor vehicle 1 with built-in headlights 2 is shown which, when switched on, produce an illuminated area 3. Illuminated area 3 shows lines of equal lighting levels $E_1$, $E_2$, and $E_3$. A measurement point 4 is defined at a preset distance from vehicle 1. In FIG. 1, a lighting level $E_3$ prevails at measurement point 4. Lighting level $E_3$ must be present at measurement point 4 when a dimmer switch, not shown here, is actuated, for example.

If the dimmer switch (not shown here) is actuated, for example, control device 5 for controlling adjusting element 6 receives an input signal to adjust headlight 2. The signal specifies lighting level $E_3$ to control device 5 as set lighting level $E_{set}$. Additional input signals x can be supplied to control device 5. Control device 5 assigns a set tilt angle $W_{set}$ with a value $W_0$ to preset lighting level $E_3$. This can be done from a table stored in a memory for example. In addition, control device 5 processes preset set tilt angle $W_0$, possibly together with an additional set tilt angle which results from input signal x, to produce a control signal S. Control signal S is passed by control device 5 to electrical adjusting element 6, an electric stepping motor for example. By means of adjusting element 6, headlight 2, shown in a side view in the upper part of FIG. 1, is adjusted to the preset set tilt angle $W_0$.

Figure 2:
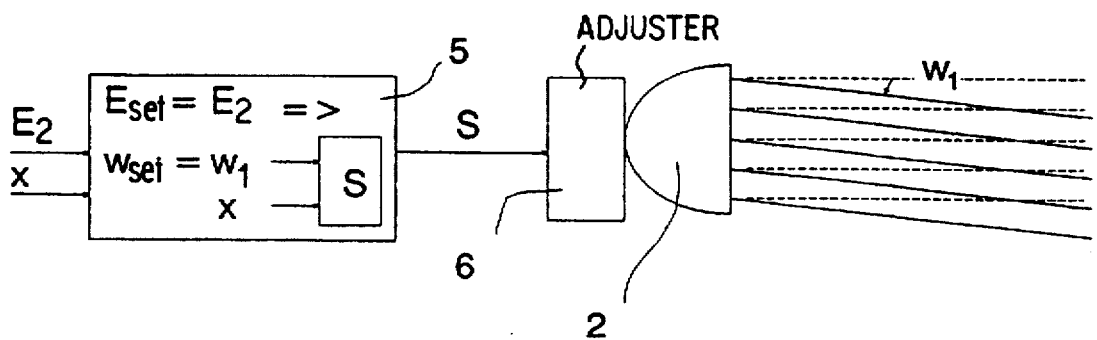
FIG. 2 shows an adjustment according to the invention of the tilt angle of the low-beam headlight at a presettable reduced lighting level, turned on for example by a daytime running light switch present in the vehicle.
Figure 2:
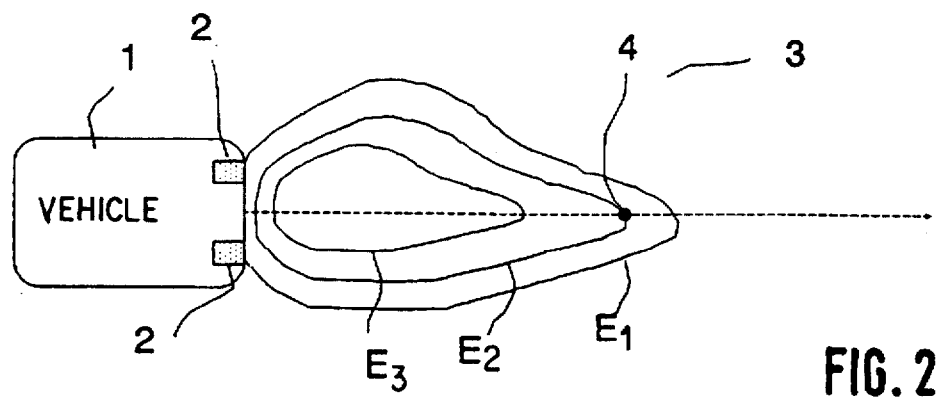

In FIG. 2, control device 5 receives as an input signal the preset lighting level $E_2$ which is below lighting level $E_3$. Input signal $E_2$ is obtained for example by actuating a "daytime running light" switch. The corresponding set tilt angle $W_{set}$ with a value of $W_1$ is assigned to this preset lighting level $E_2$. As a function of the set tilt angle $W_1$, as already described with reference to FIG. 1, a control signal S is again formed and passed from control device 5 to adjusting element 6. In FIG. 2, headlight 2 is tilted with respect to tilt angle $W_0$ in FIG. 1, corresponding to tilt angle $W_1$, further downward in the direction of the road.

Tilt angle $W_1$ produces illuminated area 3 shown in the bottom part of FIG. 2, said area being generally reduced with respect to area 3 shown illuminated in FIG. 1. At measurement point 4, illumination level $E_2$, which is reduced relative to lighting level $E_3$, now prevails.

With this embodiment according to the invention, additional requirements for headlight functions, for example the requirement for a daytime running light in various countries, can be met both without additional headlights and also without adversely affecting the lifetime of headlight bulbs.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for setting a headlight to different presettable lighting levels in a motor vehicle, said presettable lighting levels being defined by a specified light level at a predetermined measurement point in front of the headlight in the motor vehicle, comprising:

a control device which assigns to each of said different presettable lighting levels a corresponding tilt angle of the headlight relative to a longitudinal axis of the motor vehicle; and wherein said control device adjusts the tilt angle of the headlight upward or downward relative to the longitudinal axis of the motor vehicle in accordance with a desired one of said different presettable lighting levels.

2. Method for setting a headlight to different presettable lighting levels in a motor vehicle, said presettable lighting levels being defined by a specified light level at a predetermined measurement point in front of the headlight in the motor vehicle, the method comprising the steps of:

assigning to each of said different presettable lighting levels a corresponding tilt angle of the headlight relative to a longitudinal axis of the motor vehicle;

providing a desired lighting level signal for one of the different presettable lighting levels to a control device which adjusts the tilt angle of the headlight; and adjusting the tilt angle of the headlight upward or downward relative to the longitudinal axis of the motor vehicle, via said control device, to a corresponding headlight tilt angle for the desired lighting level signal to obtain the specified light levels.

* * * * *